United States Patent [19]

Houston

[11] Patent Number: 4,484,755
[45] Date of Patent: Nov. 27, 1984

[54] WHEELED CART FOR USE BY HANDICAPPED, INVALID AND FRAIL PERSONS

[76] Inventor: Rehrig Houston, 4539 Gorham St., Corona Del Mar, Calif. 92625

[21] Appl. No.: 428,854

[22] Filed: Sep. 30, 1982

[51] Int. Cl.³ .............................................. A61G 5/02
[52] U.S. Cl. ..................... 280/33.99 A; 280/289 WC; 297/DIG. 4; 403/399
[58] Field of Search ................. 280/33.99 A, 33.99 H, 280/33.99 R, 33.99 F, 495, 289 WC, 202, 204, 32.7, DIG. 4; 297/DIG. 4; 403/399, 387; 135/66

[56] References Cited

U.S. PATENT DOCUMENTS

| | | | |
|---|---|---|---|
| 2,556,121 | 6/1951 | Thomas | 280/289 WC |
| 2,776,843 | 1/1957 | Just | 280/33.99 H |
| 3,813,111 | 5/1974 | Ruger | 280/33.99 A |
| 4,273,346 | 6/1981 | Rehrig | 280/33.99 H |
| 4,305,601 | 12/1981 | Berge | 280/289 WC |

OTHER PUBLICATIONS

Visa Matic Mod. O.T.C. 88 Cart–manufactured by United Steel and Wire.

*Primary Examiner*—Richard A. Bertsch
*Assistant Examiner*—Joseph G. McCarthy
*Attorney, Agent, or Firm*—Banner, Birch, McKie & Beckett

[57] ABSTRACT

A cart having a basket and wheeled metal chassis and adapted for use by handicapped, invalid and frail persons. The basket is made of lightweight plastic wherein the rear panel is open and the side, bottom and front panels are integrally molded of open latticework construction. For additional support, a unitary bar extends along the open perimeter of the basket and along a portion of the underside of the bottom panel adjacent to the open rear edge. The basket is hingedly attached to the metal chassis to permit the baskets rotation from a horizontal to a vertical position to facilitate cleaning and close nesting with other carts.

The metal chassis is of lightweight tubular construction and rests on a plurality of swivel casters. To facilitate use of the cart by a person confined to a wheelchair to portable walker, the rear vertical members of the cart chassis are provided with V-shaped guides and fastening chains to permit attachment to the front vertical members of the wheelchair or walker. The cart is further provided with a handle to facilitate independent use of the cart. The handle also serves as a back gate for the open rear panel of the basket.

11 Claims, 7 Drawing Figures

WHEELED CART FOR USE BY HANDICAPPED, INVALID AND FRAIL PERSONS

BACKGROUND OF THE INVENTION

This invention relates generally to the field of wheeled conveyances similar to those used as grocery shopping carts in supermarkets and is particularly directed to a novel cart which is lightweight, easy to maneuver and can readily be attached to a wheelchair or portable walker for use by handicapped and invalid persons.

As society continues to recognize the special needs of the handicapped and invalid, more and more business and commerical establishments are making their facilities more readily accessible to the physically impaired. Specially designated parking areas, barrier-free construction practices and wheelchair ramps and lifts are now commonplace. Increased accessibility, however, is often coupled with the need for innovative secondary equipment as well. In supermarkets, for example, it is extremely difficult, if not impossible, for a person confined to a wheelchair to shop using a conventional grocery cart. Likewise those partially disabled shoppers who depend on the aid of a portable frame structure, commonly known as a walker, find themselves at a similar disadvantage. Furthermore, shopping carts of the prior art are designed for the physically abled person with little regard for considerations of overall weight and ease of maneuverability. Thus, the mere pushing of an empty cart of the prior art design is a burdensome task for the frail or weakened shopper. The need, therefore, exists for a grocery shopping cart which is readily usable by persons confined to wheelchairs and portable walkers and by those whose physical condition is frail or weakened.

Ideally, shopping carts, especially those used in supermarkets serving handicapped or invalid persons, should have the following characteristics:

1. They should be lighter in weight and easier to push and maneuver than carts of the prior art.
2. They should be readily usable by both handicapped and non-handicapped persons.
3. They should be nestable to conserve storage space.
4. They should be easy to maintain and not have a propensity to collect dirt and other contaminates.
5. They should be attractive and retain that attractiveness over a longer period of time than carts of the prior art.
6. The basket of the cart should be easily replaceable.

The needs of the handicapped shopper have heretofore been addressed in the prior art by adapting conventional shopping carts to attach to a wheelchair via a linkage arm. Such adaptations are typified by the Visa Matic Mod. O.T.C. 88 cart manufactured by United Steel and Wire Company.

The Visa Matic cart utilizes a unitary attachment arm extending from the rear vertical member of a conventional over-the-counter shopping cart. The arm is releasably attached along the side of a wheelchair to the wheelchair's left front and left rear vertical support members. A disadvantage associated with the Visa Matic cart is that the attachment arm is not readily attachable to the wheelchair by the wheelchair occupant. The occupant is required to reach over to one side and stretch to the rear in order to attach the arm. Wheelchair occupants having limited upper body movement and dexterity are, therefore, hard pressed to make the attachment by themselves. The same disadvantage exists when detachment is desired. A further deficiency in the Visa Matic cart is that the attachment arm is secured to only one side of the wheelchair. Unitary attachment does not permit the wheelchair occupant to have full and complete control of the cart and can create undersirable torque when turning around corners. When an even moderately loaded cart is attached to a wheelchair, turning in the direction of the unsecured side causes undersirable flexing of the cart in the opposite direction. The wheelchair occupant is, therefore, required to exert substantial force in order to maintain control of the cart and complete the turn. This problem is compounded by the fact that the basket portion of the Visa Matic cart is of wirework construction which increases the overall weight of the cart and, therefore, decreases its maneuverability.

As mentioned in my U.S. Pat. Nos. 3,999,774 and 4,273,346, which are herein incorporated by reference, baskets of wirework construction are deficient in several areas. The wires in the basket are welded at the crossing points and are then chrome plated. The plating provides a smooth, cleanable attractive surface and affords a measure of corrosion protection. Due to impacts and normal wear and tear, however, the weld joints frequently break and the plating is scraped away leaving exposed bare metal. The bare metal is subject to corrosion which results in the rapid deterioration and unsightly appearance of the cart. Further, even if the carts are cleaned periodically, dirt and food particles become entrapped in small cracks and crevices in the exposed areas creating an unsanitary condition. The unsecured wire ends also have a tendency to pinch and snag articles placed within the basket. Baskets of wirework construction are also difficult to repair. Not only is it hard to bend deformed wires back into shape, it is difficult and expensive to reweld and replate them. The cart basket and chassis are often integral with one another and therefore cannot easily be disassembled for replacement of defective components. Thus, the cart is frequently not repaired, but rather is thrown away when its become too unsightly or too unsanitary to be used.

The Visa Matic cart has the further disadvantage that it is not readily attachable to a portable walker. Thus, those individuals who are confined to a walker, commonly referred to as the walking invalid, find it extremely difficult to grocery-shop for themselves. The attachment arm on the Visa Matic cart also prevents it from being nested with other carts. Where storage space is at a premium, carts that are not nestable are particularly undesirable. Another disadvantage of the Visa Matic cart is that it is not adapted for use independent of a wheelchair. Therefore, carts of conventional design must be provided for the non-physically impaired. Purchase of the Visa Matic cart is accordingly not cost-effective and is uneconomical. The rear vertical members and wheels of the Visa Matic cart are also not inwardly and outwardly tapered, thus the cart can not be used with wheelchairs having extended footrests. Even if the attachment arm of the Visa Matic cart was made long enough to accommodate wheelchairs having longer footrests, the wheelchair occupant would be a greater distant from the basket portion of the cart making it difficult to place articles into the basket. Accordingly, the Visa Matic cart leaves unsatisfied many of the ideal characteristics that a shopping cart should possess.

Beyond supermarkets, there are many other areas and environments in which a wheeled conveyance that is readily usable by a handicapped, invalid or frail person is of practical utility. For example, in places of employment as in libraries where wheeled carts of conventional design are used by library personnel as a convenient means for transporting books. Thus, those employees who may be physically impaired and are unable to use a conventional cart must be assigned alternate tasks or be foreclosed from employment altogether. There is, accordingly, a recognized need for a wheeled conveyance having the aforementioned characteristics in many areas of our society.

SUMMARY OF THE INVENTION

It is the overall object of this invention to provide a new and improved wheeled conveyance which can be used by itself or is readily attachable to a wheelchair or portable walker for use by a handicapped or invalid person.

A specific object of this invention is to provide a new and improved cart which is lighter in weight and more maneuverable than carts of the prior art.

Another specific object of this invention is to provide a new and improved cart in which the basket is not easily damaged by impact, is easier to keep clean and retains its attractive appearance for a longer period of time than baskets of the prior art.

A further specific object of this invention is to provide a cart which can readily be attached to and detached from a wheelchair by the wheelchair occupant.

A still further specific object of this invention is to provide a cart which can readily be attached to and detached from a portable walker by the user of the walker.

A further specific object of this invention is to provide a cart having the above features which can be nested with carts of like or similar construction.

Another specific object of this invention is to provide a cart which is readily usable by both handicapped and non handicapped persons.

A still further object of this invention is to provide a cart which is easy to push and is more maneuverable than carts of the prior art and is readily usable by a frail or weakened person.

Another object of this invention is to provide a cart wherein the basket is readily replaceable.

This invention comprises a cart having a basket made of a lightweight durable material and a wheeled chassis. The basket is similar in construction to the front basket disclosed in my earlier mentioned U.S. Pat. No. 4,273,346. The chassis is of tubular construction and has a lower horizontal frame supported by four swival casters and an upper horizontal frame to which the basket is hingedly attached.

The basket is shown to be made of plastic, for example, polyethylene, which is strong, light-weight and pliable enough to absorb a heavy impact without losing its original shape. It has been found that plastic construction significantly reduces the overall weight of an average cart. A lighter basket thus, makes the cart easier to push and to maneuver. The rear panel of the basket is open and the front, side and bottom panels are integrally molded in one piece. Thus, there are no seams or weld joints to break and no cracks and crevices to collect dust, dirt and food particles. Furthermore, plastic construction eliminates the need for plating and provides a smooth cleanable surface which is easy to maintain. It also retains its attractive appearance for a long period of time.

The basket is almost entirely of open lattice-work construction, further reducing its weight and allowing its contents to be viewed from any angle. Strength and rigidity is obtained through the use of suitable integral strengthening and tapering ribs and the utilization of a cross-section configuration for the underside of the bottom panel which has a tapered form and also by a novel hinged coupling between the basket and the metal chassis. The basket is open at the rear to facilitate the placing of articles into it from behind from both a sitting and a standing position. The rear of the basket is also hinged to the chassis to permit the basket to rotate upward to facilitate cleaning or nesting with other carts of like or similar construction. A metal unitary bar extends along the open perimeter of the basket and along a portion of the underside of its bottom panel adjacent to its rear edge. The unitary bar prevents the outward bending of the upper and rear portions of the basket's front and side panels. Separate metal hinge bars, on each side of the basket, are attached to the unitary bar at the bottom area of the rear panels and extend along a portion of the underside of the basket. The free end of each respective hinge bar is received within a hinge tube mounted on the cart chassis and allows the basket's rotation from a horizontal to a vertical position. The hinge bars serve the dual purpose of reinforcing the unitary bar and also act as hinge pins for rotating the basket to a vertical position. An important feature of this invention is that the basket can easily be replaced, if necessary, by simply breaking apart the integral sides, front and bottom panels and inserting a new basket within the confines of the metal unitary reinforcing bar and the metal hinging bars. Thus, damage to the basket does not require that the entire cart be discarded.

The metal chassis is of tubular construction of sufficient height from the floor to allow a person sitting in an attached wheelchair, or standing behind an attached walker, immediately behind the cart to easily reach the interior of the basket. For mobility, the chassis rest on a plurality of swivel casters. The rear vertical members and casters of the chassis are inwardly and outwardly tapered to assure that the footrests and front wheels of a wheel chair do not interfere with the operation of the cart or the wheelchair. This permits wheelchairs having extended footrests to be used with the cart without causing the wheelchair occupant to be further away from the basket. The top rear bar of the chassis serves as a convenient means for hand pushing the cart independent of a wheelchair or portable walker. Thus the cart can be used to anyone, making it more cost effective and economical to purchase. The top rear bar also serves as a backstop for the basket when the basket is raised to a vertical position and as a rear gate for the open rear panel of the basket. There is also a secondary bar running along the inside of the handle which further prevents articles from falling through the open rear panel of the basket. On each of the rear vertical members of the chassis there is mounted a V-shaped guide and fastening chain and pin for securing the cart to each of the front vertical members of a wheelchair or a portable walker. Securing the cart to the wheelchair on both sides permits the wheelchair occupant to have complete control of the cart at all times. The attachment means are also conveniently placed in front of the user for ease of attachment and detachment. The front of the chassis is tapered inwardly to facilitate nesting and is suitably plated to provide a smooth, cleanable, attractive and corrosion resistant surface.

The wheeled conveyance described above satisfies all of the aforementioned desirable characteristics and affords the user a degree of mobility and usefulness not provided by the prior art.

PREFERRED EMBODIMENT

Figure 1:
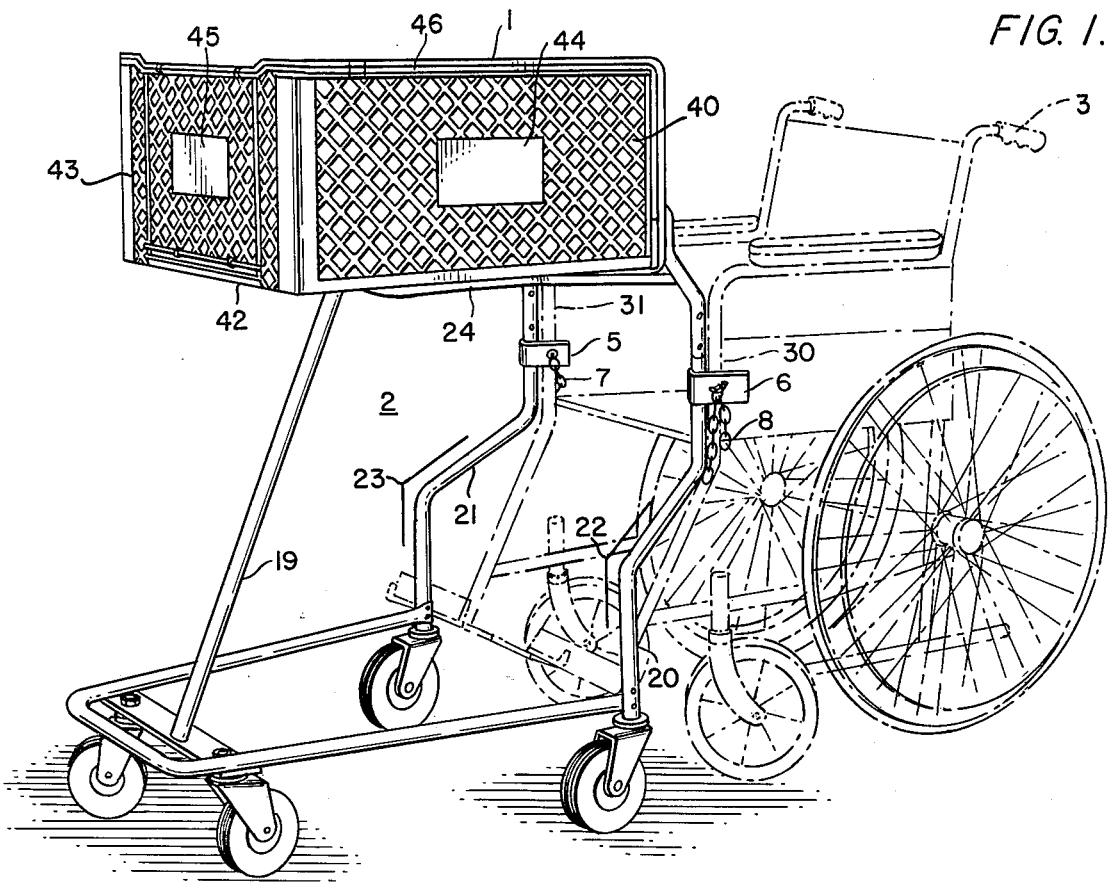
FIG. 1 is a perspective view of the cart according to the invention and is shown attached to a wheelchair.
Figure 2:
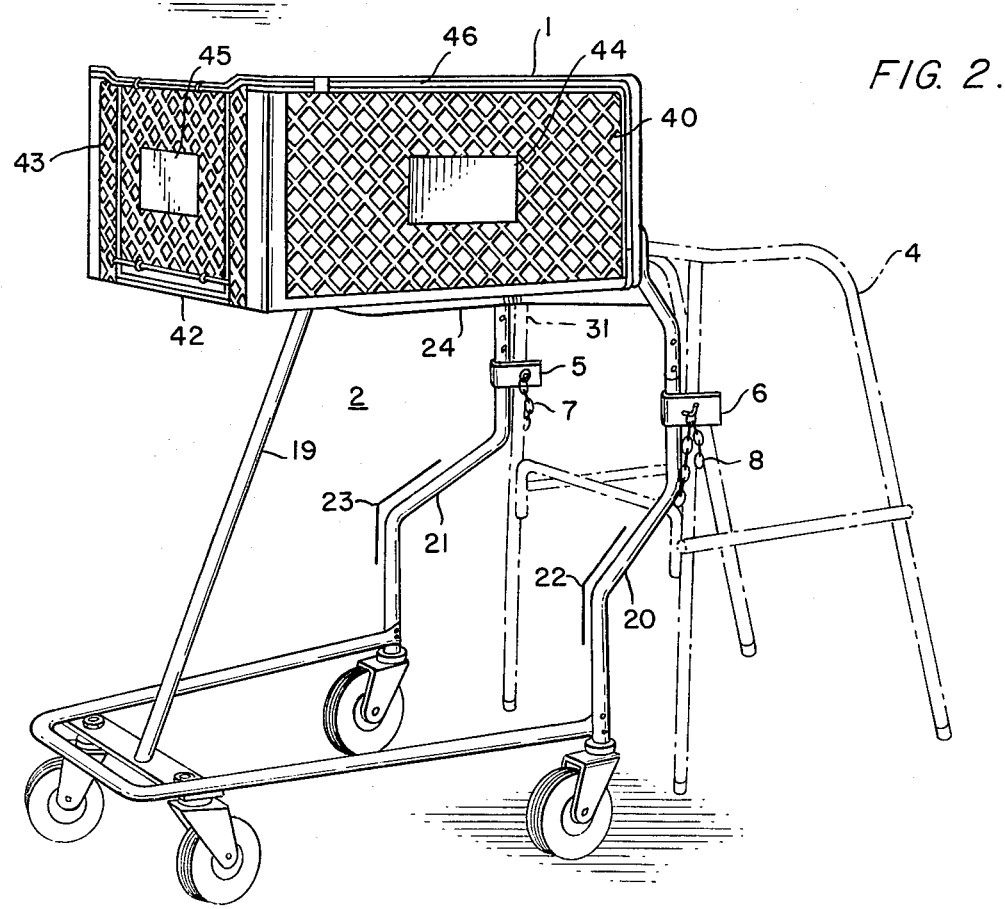
FIG. 2 is a perspective view of the same cart shown attached to a portable walker.

In the preferred embodiment of the invention shown in FIGS. 1 and 2, a plastic basket 1 is rotatably attached to a wheeled chassis 2. For use by an invalid or handicapped person, the cart can be releasably attached to a wheelchair 3 or portable walker 4 by V-shaped guides 5 and 6 and fastening chains 7 and 8.

Figure 3:
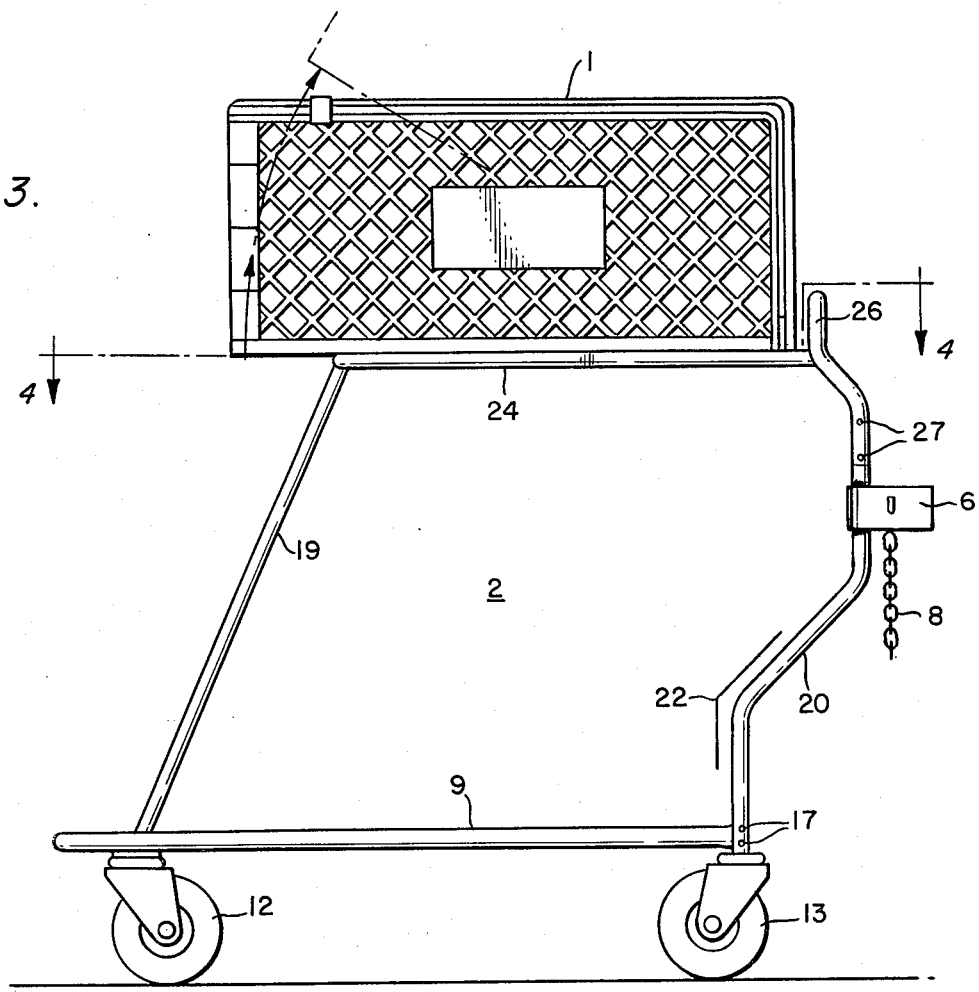
FIG. 3 is a side view of the cart in FIGS. 1 and 2 showing the basket, chassis and V-shape guides and fastening chains.
Figure 4:
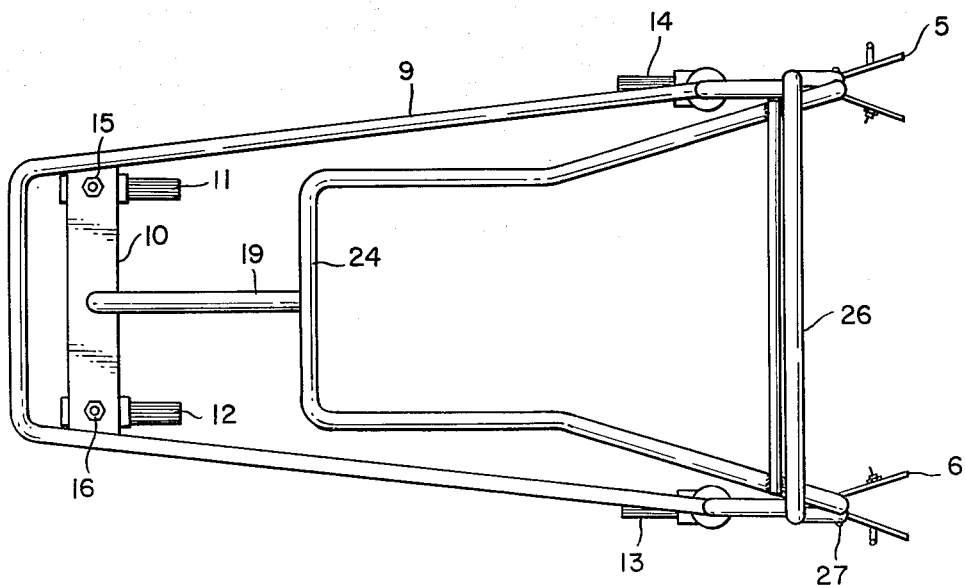
FIG. 4 is a top view showing the chassis and V-shape guides.

As shown in FIGS. 3 and 4, the wheeled chassis 2 is of tubular construction and is comprised of a lower horizontal frame 9 and cross member 10. For ease of maneuverability, the chassis rests on swivel casters 11-14. Swivel casters 11 and 12 are connected to cross member 10 by bolts 15 and 16. Swivel casters 13 and 14 are connected to frame 9 by rivet pairs 17 and 18 (18 not shown). Front vertical member 19 and rear vertical members 20 and 21 (FIGS. 1 and 2) attach to lower horizontal frame 9 and form the vertical support members for upper horizontal frame 24. Each respective rear vertical members 20 and 21 are comprised of a dogleg portion 22 and 23 that is angled forwardly and downwardly so that rear wheels 13 and 14 are located forward of the rear edge of basket 1. Dogleg portions 22 and 23 are also outwardly tapered. The above described configuration of the lower part of rear vertical members 20 and 21 provides clearance for the front wheels and footrests of practically any wheelchair while at the same time permitting the wheelchair occupant to remain sufficiently close to the basket of the cart to conveniently place articles into it. Clearance for the front wheels and footrests is also facilitated by outwardly tapering lower horizontal frame 9 from front to rear. Upper horizontal frame 24 forms the base for basket 1. Hinge tube 25 (FIG. 6) is mounted on upper horizontal frame 24 adjacent to rear vertical members 20 and 21 and receive hinge bars 48 and 49 attached to the unitary bar 46. Handle bar 26 is attached to rear vertical members 20 and 21 by rivet pairs 27 and 28, respectively (28 not shown). Secondary bar 29 (FIG. 5) is connected between the inside perimeter of handle bar 26 and in conjunction with handle bar 26, serves as a means to prevent articles from falling through the open rear panel of basket 1.

Figure 5:
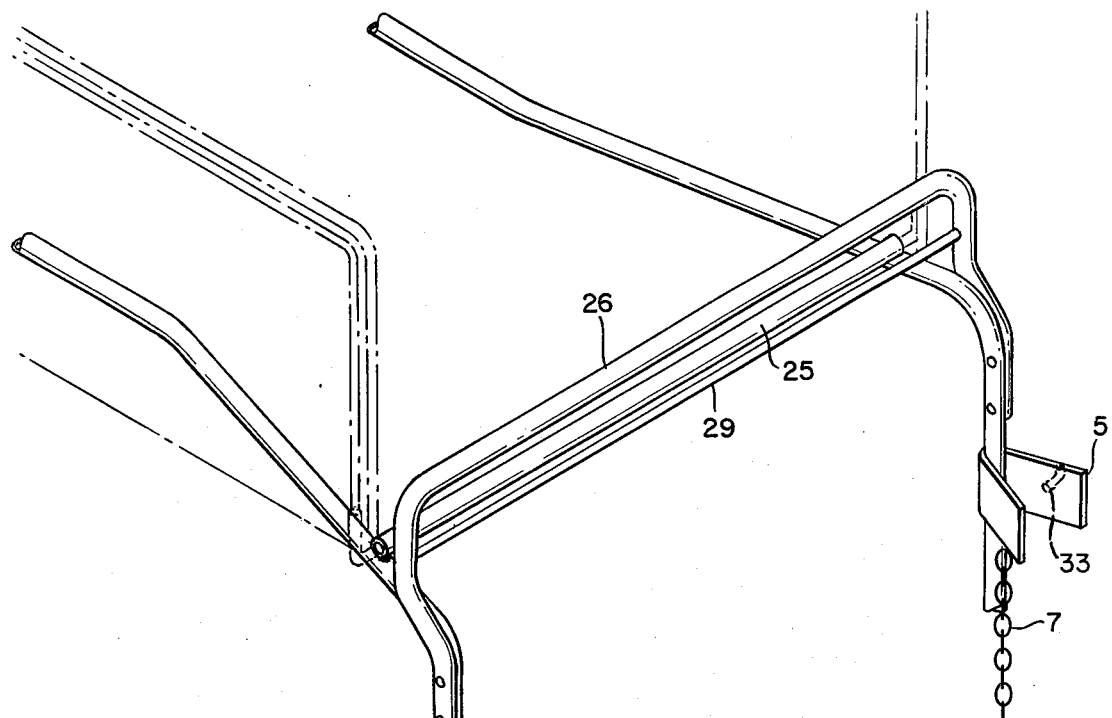
FIG. 5 is an enlarged perspective view of the rear handle bar, secondary bar, V-shape guides and fastening chains and pins.
Figure 6:
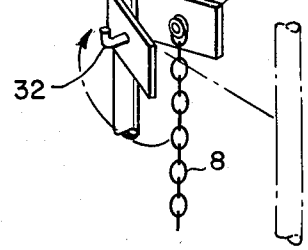
FIG. 6 is an enlarged perspective view of the basket hinge means.
Figure 7:
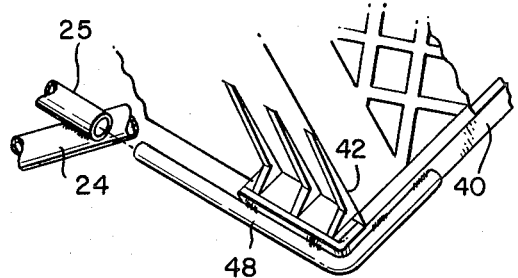
FIG. 7 is a side view illustrating several nested carts.

The V-shaped guides 5 and 6 and fastening chains 7 and 8 are best illustrated by FIG. 5. The cart is positioned in front of, for example, a wheelchair, and V-shape guides 5 and 6 are made to engage the front vertical members 30 and 31 (FIG. 1) of the wheelchair. The cart and wheelchair are held together by looping fastening chains 7 and 8 around each respective front vertical member and 30 and 31 of the wheelchair and is secured on hooks 32 and 33, respectively (FIG. 5). The cart can similarly be mated to a portable walker as shown in FIG. 2.

To facilitate construction, several members of the chassis can be formed from a continuous piece of the same material. For example, lower horizontal frame 9 can be formed from the same piece of material. Rear vertical members 20 and 21 and upper horizontal frame 24 may also be formed from the same continuous piece. While fabrication of the chassis using tubular construction is ideal, other construction materials are by no means foreclosed. For example, angle iron, flat or round bar stock or other suitable construction materials may be used as well. To improve the appearance and provide for a measure of corrosion protection, a coating material should be applied to the chassis. Where metal construction materials are used, a suitable metal plating, paint or vinyl coating may be used.

Basket 1 is made of a plastic material such as polyethylene. This material provides a basket that is strong and durable but yet is light in weight and flexible enough to absorb some deformation, such as caused by impact, without breaking. Other materials having similar properties may also be used. Basket 1 is comprised of two side panels 40 and 41 (41 not shown), a bottom panel 42 and a front panel 43 (FIG. 1). The rear panel is left open to facilitate placing articles into basket 1 from the rear of the cart. Side panels 40 and 41, bottom panel 42 and front panel 43 of basket 1 are injection molded, integral with one another, in a single unit. Single piece construction provides a basket that is structurally sound without joints and interfaces to later break. Basket 1 is constructed substantially of open latticework. Latticework construction permits the user to observe the contents of the basket from virtually any position. It also represents a significant saving in material making basket 1 cheaper to manufacture and much lighter in weight. Open latticework construction also facilitates cleaning of the basket. The lattice can be any of a multitude of patterns and as shown herein, the pattern is diamond shaped. Bottom panel 42 is integrally attached to side panels 40 and 41 and front panel 43. Although substantially of open latticework construction, solid portions are added to the lattice at various points as known in the prior art to add strength to the various panels. In addition, solid portions 44 and 45 (FIGS. 1 and 2) can be added to the sides and front to carry a label or advertising. Because it is necessary that basket 1 be strong and be able to withstand compact and high loading, additional reinforcement is provided by way of a metal unitary bar 46 which is disposed within a channel that extends along side panels 40 and 41 and front panel 43 adjacent their free edge. Separate metal hinge bars 48 and 49 (FIG. 6-hinge bar 49 not shown) are attached to unitary bar 46 and extend along a portion of the underside of basket 1. The free ends of hinge bars 48 and 49 are received within hinge tube 25 (FIG. 6) to allow basket 1 to rotate from a horizontal to a vertical position to facilitate cleaning and close nesting with carts of the same or similar construction.

It may be noted that many modifications and variations of the above described embodiment will become apparent to those of ordinary skill in the art from a reading of this disclosure. The invention is not limited to the particular apparatus disclosed, its scope is governed only by the scope of the appended claims.

I claim:

1. A wheeled conveyance attachable to the front vertical support members of a wheelchair, said wheeled conveyance comprising:
   a basket; and
   a chassis having a plurality of casters, first and second rear vertical members, means for supporting said basket, and means for readily attaching and detaching each respective first and second rear vertical members to said front vertical members of said wheelchair, said first and second rear vertical members each having a lower dogleg portion that is sufficiently angled forwardly, downwardly and outwardly to provide clearance for the front wheels and footrests of an attached wheelchair.

2. A wheeled conveyance attachable to the front vertical support members of a portable walker, said wheeled conveyance comprising:
   a basket; and
   a chassis having a plurality of casters, first and second rear vertical members, means for supporting said basket, and means for readily attaching and detaching each respective first and second rear vertical members to said front vertical members of said portable walker, said first and second rear vertical members each having a lower dogleg portion that is angled forwardly, downwardly and outwardly.

3. The wheeled conveyance of claim 1 or 2 wherein said basket is hingedly attached to said chassis and is capable of being rotated from a horizontal position to a vertical position relative to the chassis.

4. The wheeled conveyance of claim 1 or 2 wherein said cart is adapted for nesting with other carts of similar or like construction.

5. The wheeled conveyance of claim 1 or 2 wherein said basket is made of plastic.

6. The wheeled conveyance of claim 5 wherein said basket further comprises a pair of side panels, a bottom panel and a front panel which are all substantially of open lattice construction.

7. The wheeled conveyance of claim 6 wherein said pair of side panels, said bottom panel and said front panel are integrally molded with one another.

8. The wheeled conveyance of claim 1 wherein said chassis is further comprised of a lower horizontal frame, said frame being sufficiently outwardly tapered from front to rear of the chassis to provide clearance for the front wheels and footrests of an attached wheelchair.

9. The wheeled conveyance of claim 1 or 2 wherein said chassis is further comprised of a handle bar portion of sufficient height to faciliate manually pushing the cart independent of an attached wheelchair or walker.

10. The wheeled conveyance of claim 9 wherein said handle bar portion is adapted to serve as a rear barrier for said basket.

11. The wheeled conveyance of claim 1 or 2 wherein said attachment means comprises:
    a V-shaped guide attached to each respective said first and second rear vertical members;
    a fastening chain attached to one side of the V of each V-shaped guide; and
    a hook attached to the other side of the V of each V-shaped guide.

* * * * *